(12) United States Patent
Dutil

(10) Patent No.: US 6,575,860 B2
(45) Date of Patent: Jun. 10, 2003

(54) BELT TENSIONER FOR A POWER TRANSMISSION BELT SYSTEM

(75) Inventor: Kevin G. Dutil, Springfield, MO (US)

(73) Assignee: Dayco Products, LLC, Miamisburg, OH (US)

( * ) Notice: Subject to any disclaimer, the term of this patent is extended or adjusted under 35 U.S.C. 154(b) by 26 days.

(21) Appl. No.: 09/794,437

(22) Filed: Feb. 28, 2001

(65) Prior Publication Data

US 2002/0119850 A1 Aug. 29, 2002

(51) Int. Cl.[7] ................................................. F16H 7/12
(52) U.S. Cl. ........................................................ 474/135
(58) Field of Search ................................. 474/135, 133, 474/136, 101, 113–117, 138, 109

(56) References Cited

U.S. PATENT DOCUMENTS

| | | | | |
|---|---|---|---|---|
| 4,698,049 A | * | 10/1987 | Bytzek et al. | 474/135 |
| 4,983,145 A | * | 1/1991 | Hirai et al. | 474/135 |
| 5,030,172 A | * | 7/1991 | Green et al. | 474/135 |
| 5,312,302 A | * | 5/1994 | Yamamoto | 474/135 |
| 5,334,109 A | * | 8/1994 | Izutsu et al. | 474/135 |
| 5,443,424 A | * | 8/1995 | Henderson | 474/135 |
| 5,545,095 A | | 8/1996 | Henderson | 474/135 |
| 5,718,649 A | * | 2/1998 | Hong et al. | 474/101 |
| 5,803,850 A | | 9/1998 | Hong et al. | 474/135 |

FOREIGN PATENT DOCUMENTS

DE    3929753 C1 * 1/1991 ................ 474/101

* cited by examiner

Primary Examiner—Marcus Charles
(74) Attorney, Agent, or Firm—Joseph V. Tassone

(57) ABSTRACT

A belt tensioner for a power transmission belt system includes: (a) a base housing having a pivot shaft extending therefrom; (b) a tension arm pivotally mounted on the pivot shaft at a proximal end thereof, the proximal end of the tension arm including a rub surface and the distal end of the tension arm adapted to contact a power transmission belt; (c) a torsion spring operatively coupled between the base housing and the tension arm and adapted to bias the distal end of the tension arm against the power transmission belt; and (d) a damper assembly coupled to the housing, the damper assembly including: (1) a body of friction material that includes a friction surface adjacent to and facing the rub surface of the tension arm and (2) a damper spring integral with the body of friction material and biasing the body of friction material and associated friction surface against the rub surface of the tension arm.

55 Claims, 5 Drawing Sheets

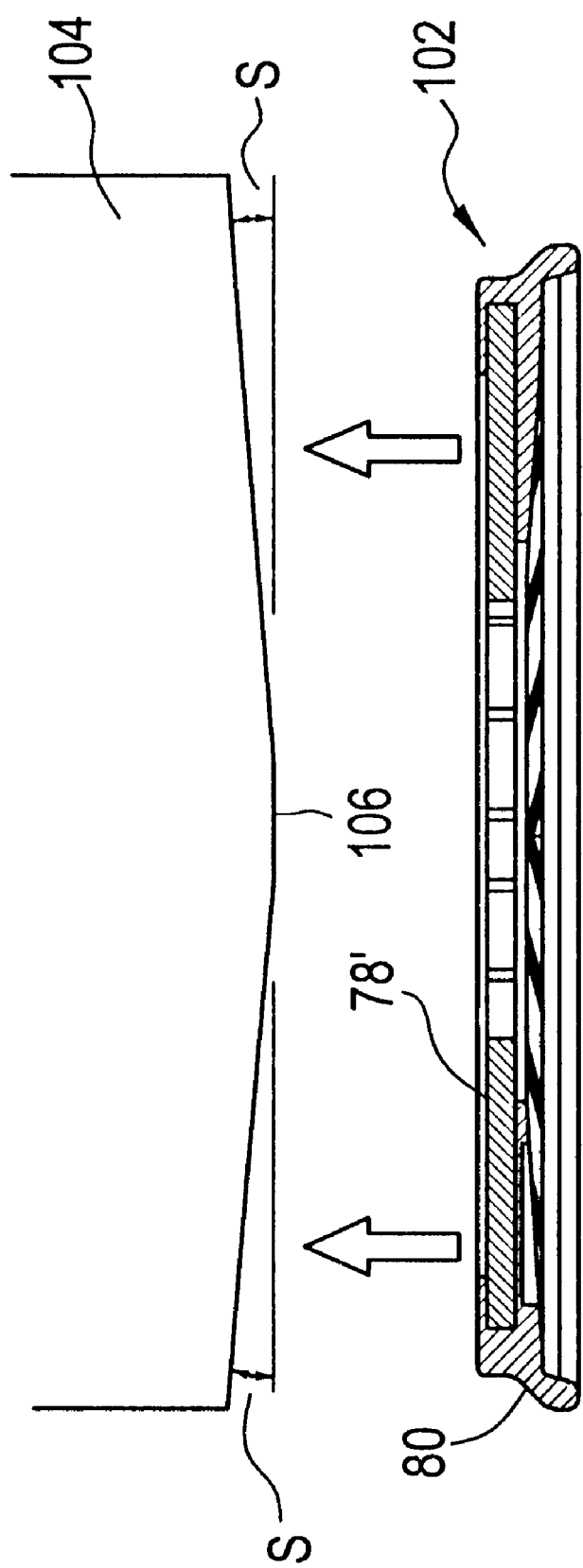

BELT TENSIONER FOR A POWER TRANSMISSION BELT SYSTEM

BACKGROUND

The present invention is directed to a belt tensioner for a transmission belt system, and more specifically, to an improved damper assembly for the belt tensioner and a method for constructing the belt tensioner incorporating the improved damper assembly.

The main purpose of an automatic belt tensioner is to prolong the life of an engine or accessory drive belt. The most typical use for such automatic belt tensioners is on front-end accessory drives in an automobile engine. This drive includes pulley sheaves for each accessory the belt is required to power, such as the air conditioner, water pump, fan and alternator. Each of these accessories requires varying amounts of power at various times during operation. These power variations, or torsionals, create a slackening and tightening situation of each span of the belt. The belt tensioner is utilized to absorb these torsionals through use of an internally mounted torsion spring. Reference can be made to U.S. Pat. Nos. 5,545,095 or 5,803,850 (each of which are incorporated herein by reference) for examples of prior art belt tensioners.

The automatic belt tensioner will include a tension arm pivotally mounted to a base housing or spring case, where the torsion spring is operatively coupled between the tension arm and the base housing so as to force the distal end of the tension arm against the drive belt, and in turn, to provide sufficient tension force on the drive belt as desired. The size of torsional loads experienced by the drive belt is sometimes large enough to significantly move the tension arm away from the belt, causing the tension in the belt to be temporarily reduced. This is not favorable above a certain degree and squealing and squeaking of the belt may result. Therefore, typical belt tensioners incorporate dampening devices to slow the pivotal movement of the tension arm.

SUMMARY

The present invention provides a belt tensioner for a transmission belt system that includes an improved damper assembly; and furthermore, a method for manufacturing such a belt tensioner that includes the improved damper assembly.

A first aspect of the present invention is directed to a belt tensioner for a power transmission belt system that includes (a) a base housing including a pivot shaft extending therefrom; (b) a tension arm pivotally mounted on the pivot shaft at a proximal end thereof, the proximal end of the tension arm including a rub surface and the distal end of the tension arm adapted to contact a power transmission belt; (c) a torsion spring operatively coupled between the base and the tension arm and adapted to bias the distal end of the tension arm against the power transmission belt; and (d) a damper assembly coupled to the housing, the damper assembly including: (1) a body of friction material that includes a friction surface adjacent to and facing the rub surface of the tension arm and (2) a damper spring integral with the body of friction material and biasing the body of friction material and associated friction surface against the rub surface of the tension arm.

In a more detailed embodiment, the damper assembly is substantially disk shaped and coaxially mounted on the pivot shaft. In a further detailed embodiment, the damper spring is an annular metallic spring plate coaxially integrated with a substantially disk-shaped body of friction material. In yet a further detailed embodiment, the spring plate has a generally conical shape and includes a convex side facing toward the rub surface of the tension arm, where the generally conical shape of the spring plate biases the body of friction material axially against the rub surface of the tension arm. In yet a further detailed embodiment, the damper assembly includes an annular flange extending at least partially axially towards the tension arm and encircling an annular shoulder of the tension arm, thereby providing a labyrinth seal between the damper assembly and the tension arm. In yet a further detailed embodiment, the annular flange extends from the body of the friction material.

In an alternative detailed embodiment of the first aspect of the present invention, the body of friction material is molded over the damper spring. In a further detailed embodiment, the body of friction material is a wear-resistant plastic material. In a further detailed embodiment, the body of friction material is substantially disk shaped, and the damper spring is an annular metallic spring plate coaxially molded with the substantially disk-shaped body of friction material and the annular metallic spring plate biases the body of friction materially axially against the rub surface of the tension arm. In a further detailed embodiment, the annular metallic spring plate is coaxially attached to the pivot shaft of the base housing, and the proximal end of the tension arm is retained axially between the damper assembly and the base housing by the coaxially attachment of the annular metallic spring plate and pivot shaft.

In an alternate detailed embodiment of the first aspect of the present invention, the damper assembly is mounted to the base housing, coaxially with the pivot shaft, and includes an annular flange extending at least partially axially towards the tension arm and encircling an annular shoulder of the tension arm, thereby providing a labyrinth seal between the damper assembly and the tension arm. In a further detailed embodiment, the annular flange extends from the body of friction material. In an even further detailed embodiment the annular flange extending from the damper assembly has an inner diameter slightly larger than the outer diameter of the annular shoulder of the tension arm.

A second aspect of the present invention is directed to a belt tensioner for a power transmission belt system that includes: (a) a base housing including a pivot shaft extending therefrom; (b) a tension arm pivotally mounted on the pivot shaft at a proximal end thereof, where the proximal end of the tension arm includes a rub surface and the distal end of the tension arm is adapted to contact a power transmission belt; (c) a torsion spring operatively coupled between the base and the tension arm, and adapted to bias the distal end of the tension arm against the power transmission belt; and (d) a damper assembly coupled to the housing, where the damper assembly includes: (1) an annular spring plate coaxially attached to the pivot shaft of the base housing and (2) a body of friction material having at least a portion positioned axially between the annular spring plate and the rub surface of the tension arm; (e) where the body of friction material includes a friction surface adjacent to and facing the rub surface of the tension arm; and (f) where the annular spring plate biases the body of friction material and associated friction surface against the rub surface of the tension arm and retains the proximal end of the tension arm and the body of friction material axially between the annular spring plate and the base housing.

In a further detailed embodiment of the second aspect of the present invention described above, the body of friction material is annular and is positioned coaxially with the pivot shaft, and includes an annular flange extending at least partially axially toward the tension arm and encircling an annular shoulder of the tension arm, thereby providing a labyrinth seal between the body of friction material and the tension arm. In a further detailed embodiment, the annular flange extending from the damper assembly has an inner diameter that is slightly larger than the outer diameter of the annular shoulder of the tension arm. And in a further detailed embodiment, the body of friction material is molded over the annular spring late.

In an alternate detailed embodiment of the second aspect of the present invention described above, the body of the friction material is molded over the annular spring plate.

In another alternate embodiment of the second aspect of the present invention described above, the body of friction material is substantially annular and coaxially positioned with respect to the pivot shaft. In a more detailed embodiment, the rub surface of the tension arm and the friction surface of the body of friction material are substantially annular, coaxial with the pivot shaft, and residing on parallel planes at least partially perpendicular to the access of the pivot shaft.

A third aspect of the present invention is directed to a belt tensioner for a power transmission belt system that includes: (a) a base housing; (b) a tension arm pivotally mounted on the base housing at a proximal end of the tension arm, where the proximal end of the tension arm includes a rub surface and the distal end of the tension arm is adapted to contact a power transmission belt; (c) a torsion spring operatively coupled between the base housing and the tension arm, and adapted to bias the distal end of the tension arm against the power transmission belt; and (d) a damper assembly coupled to the housing, where the damper assembly includes: (1) a body of friction material having a friction surface adjacent to and facing the rub surface of the tension arm, and (2) a damper spring biasing the body of friction material and associated friction surface against the rub surface of the tension arm; (e) where the damper assembly includes an annular flange extending at least partially axially towards the tension arm, and the flange encircles an annular shoulder of the tension arm, thereby providing a labyrinth seal between the body of friction material and the tension arm.

In a more detailed embodiment of the third aspect of the present invention described above, the annular flange extending from the damper assembly has an inner diameter that is slightly larger than the outer diameter of the annular shoulder of the tension arm. In a further detailed embodiment, the body of friction material encircles the pivot shaft and the annular flange extends from the body of the friction material. In an even further detailed embodiment, the body of friction material is molded over the annular spring plate.

In a fourth aspect of the present invention, a belt tensioner for a power transmission belt system comprises: (a) a base housing; (b) a tension arm pivotally mounted on the base housing at a proximal end of the tension arm, where the proximal end of the tension arm includes a rub surface and the distal end of the tension arm is adapted to contact a power transmission belt; (c) a torsion spring operatively coupled between the base housing and the tension arm, and adapted to bias the distal end of the tension arm against the power transmission belt; (d) a damper assembly coupled to the base housing, where the damper assembly includes: (1) a body of friction material having a friction surface adjacent to and facing the rub surface of the tension arm and (2) a damper spring biasing the body of friction material and associated friction surface against the rub surface of the tension arm; and (e) a labyrinth seal provided between the damper assembly and the tension arm.

In a more detailed embodiment of the fourth aspect of the present invention described above, the labyrinth seal includes an annular flange extending from one of the damper assembly or the tension arm at least partially axially towards the other of the damper assembly and the tension arm, and the flange encircles an annular shoulder of the other one of the damper assembly and the tension arm.

In an alternate detailed embodiment of the fourth aspect of the present invention described above, the labyrinth seal includes an annular flange extending from one of the body of friction material and the tension arm at least partially axially towards the other of the body of friction material and the tension arm, and the flange encircles the annular shoulder of the other of the body of friction material and the tension arm.

In a fifth aspect of the present invention, a method for assembling a belt tensioner is provided that includes the steps of: (a) providing a base housing including a pivot shaft; (b) positioning a torsion spring on the pivot shaft; (c) positioning a proximal end of the tension arm on the pivot shaft, where the proximal end of the tension arm includes a rub surface at least partially encircling the pivot shaft; (d) coupling the torsion spring between the base housing and the pivot shaft; (e) positioning a friction body axially over the proximal end of the tension arm such that a friction surface of the friction body faces the rub surface of the tension arm; and (f) fixedly attaching a substantially annular spring plate axially over at least a portion of the friction body to retain the proximal end of the tension arm and a portion of the friction body axially between the base housing and the spring plate and to bias the friction surface of the friction body against the rub surface of the tension arm.

In a more detailed embodiment of the method of the fifth aspect of the present invention, the method further comprises the steps of deforming a substantially planer annular plate in a generally conical shape to provide the annular spring plate, simultaneous to or prior to the fixedly attaching step. In an even more detailed embodiment of this method, the annular spring plate has a center hole that includes an inner circumferential surface with a plurality of teeth extending radially inwardly therefrom, and the fixedly attaching step includes a step of expanding the diameter of the hollow upper end of the pivot shaft to radially force the outer circumferential, surface of the center hole in the annular spring plate, thereby causing the annular teeth to become embedded into the pivot shaft.

In an alternate detailed embodiment of the method described in the fifth aspect of the present invention, the method further comprises the step of, prior to the fixedly attaching step, molding the friction body over the annular spring plate. In an even further detailed embodiment, the method further comprises the step of deforming a substantially planar annular plate in a generally conical shape to provide the annular spring plate, simultaneous to or prior to the fixedly attaching step. This deforming step may occur prior to the molding step or after the molding step.

In another alternate detailed embodiment of the fifth aspect of the present invention described above, the method further comprises the step of providing a labyrinth seal between the friction body and the tension arm. In a further detailed embodiment, the method further comprises the step of, prior to the fixedly attaching step, molding the friction body over the annular spring plate. In an even further detailed embodiment, the tension arm includes an annular shoulder coaxial with the pivot shaft, the molding step includes a step of molding an annular flange extending at least partially axially from the friction body, where the annular flange has a diameter slightly larger than the diameter of the annular shoulder of the tension arm, and the step of positioning a friction body axially over the proximal end of the tension arm includes the step of encircling the annular shoulder of the tension arm with the annular flange extending from the friction body to provide a labyrinth seal between the friction body and the tension arm.

BRIEF DESCRIPTION OF THE DRAWINGS

FIG. 3a is a magnified view of the portion of FIG. 3 enclosed by the circle labeled 3a;

FIG. 4 illustrates a step of deforming the spring plate component of the exemplary embodiment of the present invention.

DETAILED DESCRIPTION

The present invention is directed to a belt tensioner for a transmission belt system, and more specifically, to an improved damper assembly for the belt tensioner and a method for constructing the belt tensioner incorporating the improved damper assembly.

Figure 1:
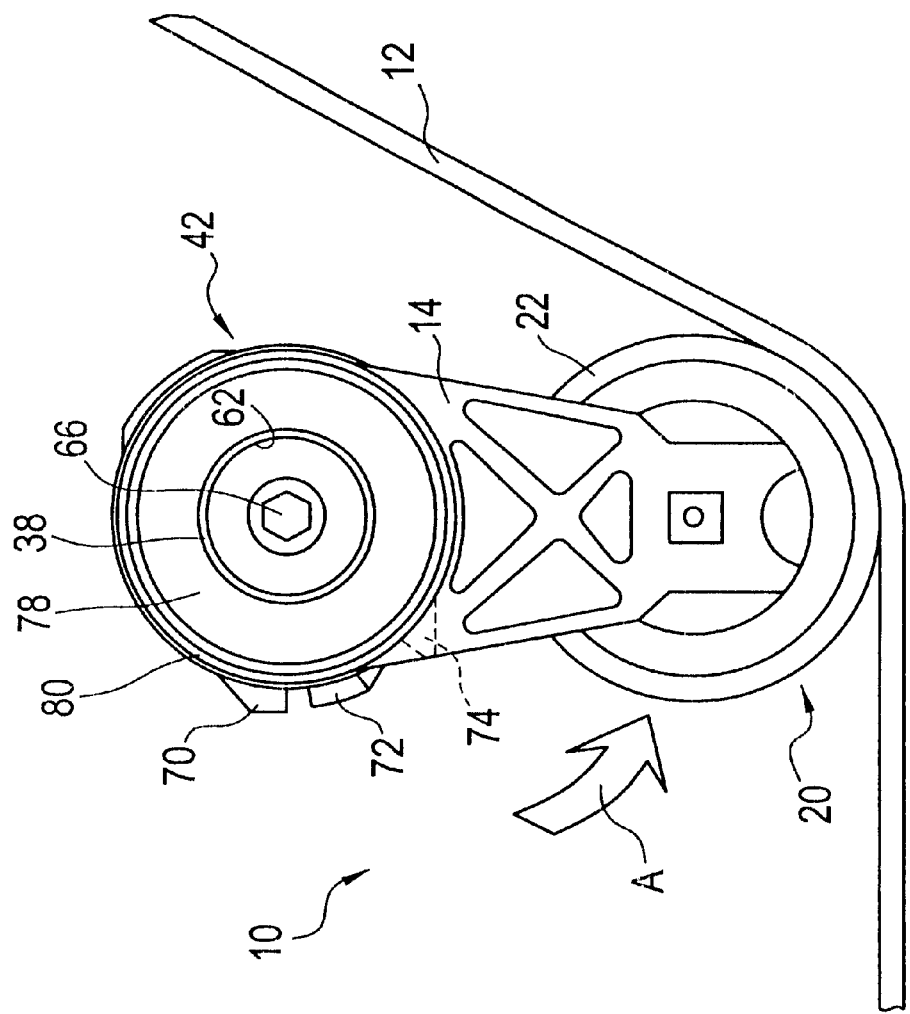
FIG. 1 is a top plan view of the belt tensioner assembly according to an exemplary embodiment of the present invention, acting upon a power transmission belt of a power transmission belt assembly.
Figure 2:
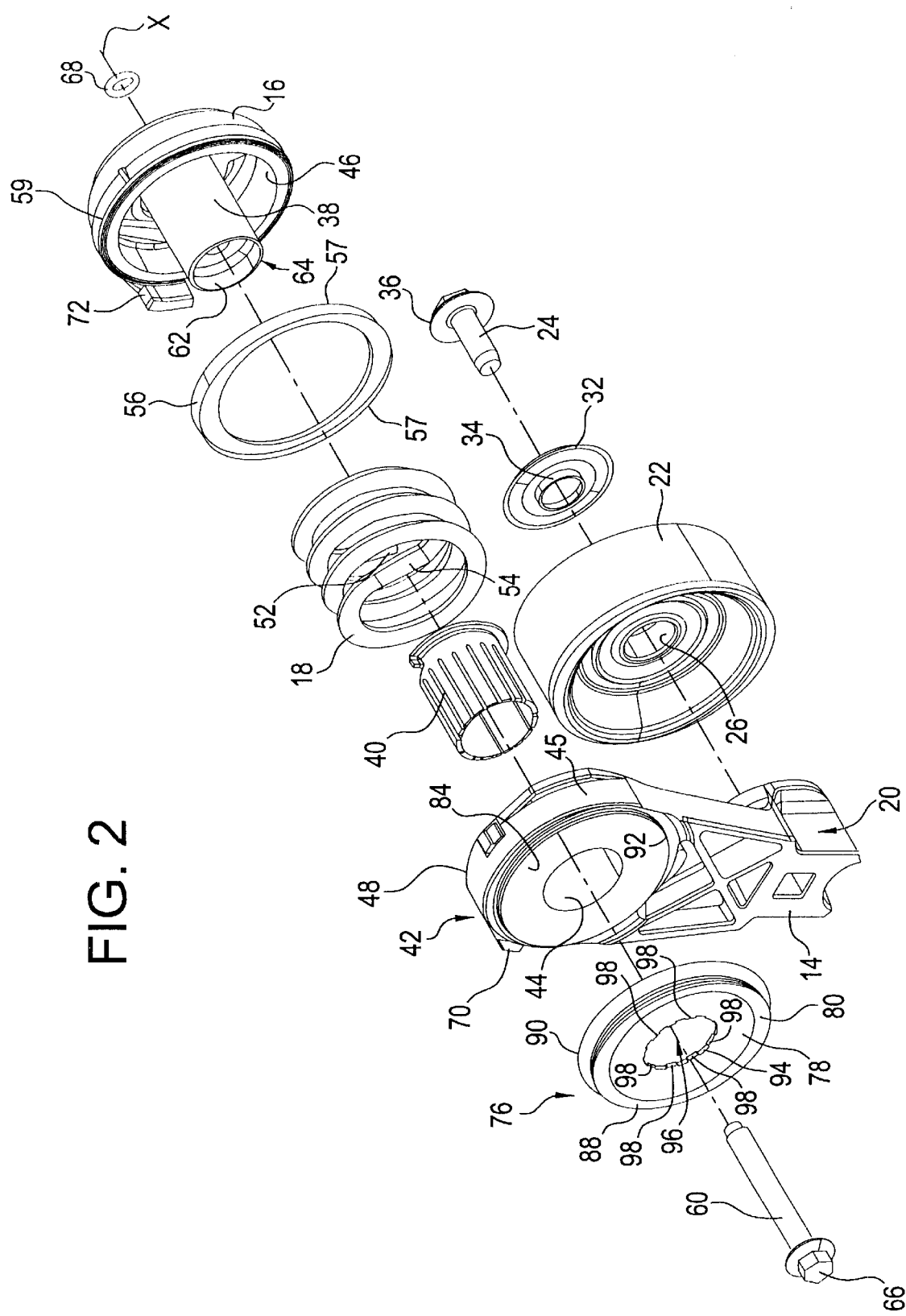
FIG. 2 is a perspective, exploded view of the exemplary embodiment of the present invention.
Figure 3:
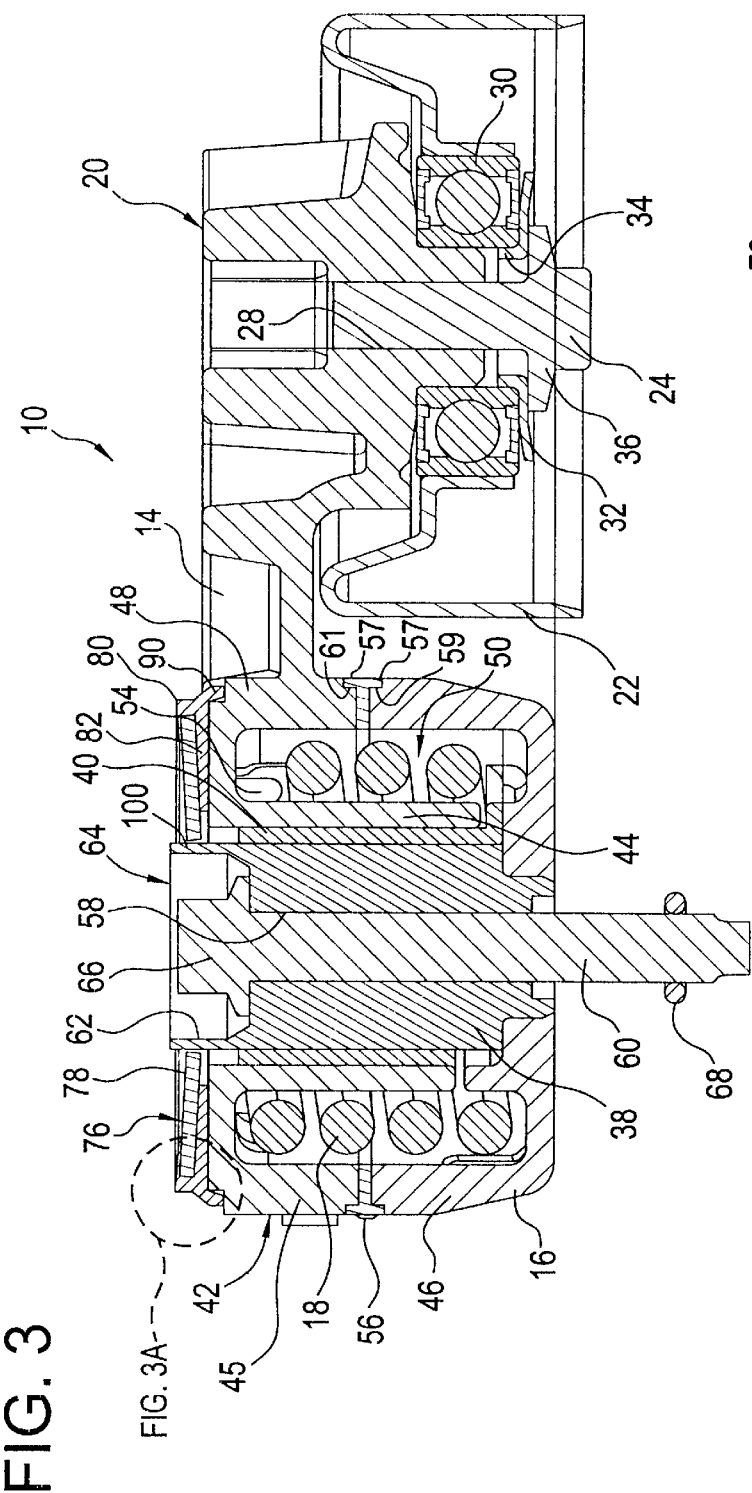
FIG. 3 is an elevational, cross-sectional view of the exemplary embodiment of the present invention.

As shown in FIGS. 1–3, an exemplary embodiment of the belt tensioner 10 for providing a predetermined amount of tension upon a transmission belt 12 of a transmission belt system includes a die-cast aluminum tension arm 14 pivotally mounted to a die-cast aluminum housing or spring case 16 and including a steel torsion spring 18 operatively coupled between the tension arm and the housing 16, where the torsion spring 18 applies a torsional force on the tension arm 14 in the direction shown by arrow A (FIG. 1), such that the distal end 20 of the tension arm 14 applies a corresponding tension force upon the transmission belt 12. While the tension arm 14 and housing 16 are indicated as being manufactured from die-cast aluminum and while the torsion spring 18 is identified as being manufactured from steel, it is within the scope of the present invention to utilize suitable alternative materials (or combination of materials/components) to construct such components. Additionally, while the torsion spring 18 in the exemplary embodiment is a coil spring, it is within the scope of the invention to use other suitable springs, such as a flat wire spring.

A pulley 22 is mounted for rotation to the distal end 20 of the tension arm 14 by a bolt 24 extending through the hub 26 of the pulley 22 and into a threaded bore 28 of the distal end 20 of the tension arm 14. The pulley 22 is journaled to the distal end 20 of the tension arm 14 by appropriate roller bearings 30. A dust cover 32 in the shape of a washer with an annular flange 34 extending axially inwardly from the hub of the washer is coaxially mounted between the bearings 30 and the head 36 of the bolt 24 to protect the bearings 30 from contamination.

The housing 16 is generally bowl-shaped and includes a pivot shaft 38 extending coaxially upward from the inner surface of the convex side of the bowl-shaped housing. A tubular, wear resistant plastic bushing 40 is positioned around the outer circumferential surface of the pivot shaft 38. The proximal end 42 of the arm 14 is a complementary bowl-shaped pivot housing 45 that includes a cylindrical pivot tube 44 extending axially downward from the convex side thereof, where the pivot tube 44 is coaxial with the pivot shaft 38 and has an inner diameter that substantially matches (or is slightly larger than) the outer diameter of the bushing 40. Accordingly, the cylindrical pivot tube 44 is used to pivotally mount the tension arm 14 on the pivot shaft 38 of the housing 16. It will be understood that while the bushing 40 in this exemplary embodiment is a wear resistant plastic, it is within the scope of the invention to use other suitable bushing materials or bearing structures.

The housing 16 includes a circumferential wall 46, the inner surface of which mates with the complementary outer surface of circumferential wall 48 of the pivot housing 45 of the tension arm 14. An annular space is provided between each of the circumferential wall 46, 48 and the cylindrical pivot tube 44 of the tension arm 14, which extends along a substantial portion of the axial length of the pivot shaft 38 extending from the housing 16. This annular space provided within the circumferential wall 46, 48 provides an annular cavity 50 for seating the torsion spring 18 therein. A first end 52 of the torsion spring is attached to the inner surface of the housing 16 and the opposite end 54 of the torsion spring is attached to the inner surface of the pivot housing 45 of the tension arm 14. Annular outer bushing 56 formed from wear resistant plastic is positioned axially between the circumferential wall 46 or the housing and the circumferential wall 48 of the pivot housing 45 of the tension arm 14. The outer bushing 56 which includes axially extending annular flanges 57 seated within complementary annular grooves 59, 61 of the respective housings 16, 45 and also acts to seal the annular cavity 50 seating the torsion spring 18 therein from external contaminants. Again, it will be understood that while the outer bushing 56 in this exemplary embodiment is a wear resistant plastic, it is within the scope of the invention to use other suitable bushing materials or bearing structures.

In the exemplary embodiment, the pivot tube 38 is a solid steel (or other suitable material, such as aluminum or powdered metal) insert that includes a center bore 58 for receiving an attachment bolt 60 therein and a larger diameter counter-bore 62 extending into its upper end 64 to provide a seat for the head 66 of the attachment bolt 60 and is also useful in assembly process, as will be described in further detail below. The retaining O-ring 68 shown in the figures is used to prevent the attachment bolt 60 from exiting out from the central bore 58 of the pivot tube 38 during shipment. The outer circumferential surface of the pivot housing 45 of the tension arm 14 includes a radially extending projection 70 and the outer circumferential surface of the housing 16 includes a radially projecting and upwardly extending projection 72 having an axial position substantially matching that of the projection 70 on the tension arm. Accordingly, the projection 70 acts as a tension arm stop for abutting against the projection 72 to limit rotation of the tension arm 14 in the direction indicated by arrow A, thereby prohibiting the torsion spring 18 from unwinding completely. Additionally, a certain amount of rotational travel of the tension arm 14 is required to install the belt tensioner on the appropriate drive. Accordingly, to avoid over stressing of the torsion spring 18 during this installation process, a second radially extending projection 74 is provided on the tension arm 14 to limit rotation of the tension arm during the installation process. It will be understood by those of ordinary skill in the art that other suitable pivot assemblies for pivotally coupling the tension arm 14 to the housing 16 are available and are thus within the scope of the invention.

Figure 3A:
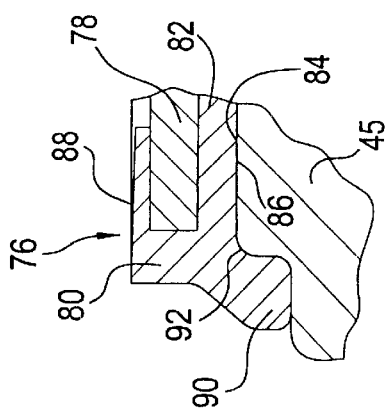

Referring primarily to FIGS. 2, 3 & 3a, the exemplary embodiment of the present invention utilizes a damper assembly 76 that also acts as a clamping plate for axially clamping the various components of the belt tensioner together at the proximal end 42 of the tension arm 14. The damper assembly 76 includes a damper spring, or spring plate 78, substantially in the form of a belleville spring onto which is integrally molded an annular sheath 80 of wear resistant plastic material. Although not shown in the drawings, the spring plate 78 includes a plurality of teeth or projections extending radially outwardly from its outer circumferential surface and into the sheath for prohibiting rotation of the sheath 80 with respect to the spring plate 78. The spring plate 78 is, in the exemplary embodiment, a hardened steel plate and the wear resistant plastic material of the sheath 80 is, in the exemplary embodiment, a polyamide 46 nylon material. Of course, it is within the scope of the invention to utilize suitable alternative materials (or combinations of materials and components). For Example, suitable alternative friction materials include, but are not limited to: all polyamides (PA) including 66 nylon, 6 nylon, 11 nylon, 12 nylon, 69 nylon, and 610 nylon; polyetherimides (PEI); polysulfones (PSU); polyethersulfones (PES or PESU); polyoxymethylenes (POM), or acetals; polyetheretherketones (PEEK); polyphenylene sulfides (PPS); polyphthalamides (PPA), e.g., A model®, a high temperature, high performance thermoplastic based on polyphthalamide chemistry, available from Amoco; polyphenyene oxides (PPO); and amorphous nylons.

Referring to FIGS. 3 and 3a in particular, the sheath 80 of wear-resistant plastic material molded over the spring plate 78 includes a substantially planer and annular friction segment 82 positioned axially between the spring plate 78 and the upper rub surface 84 of the pivot housing 45 of the tension arm 14. Referring primarily to FIG. 2, the upper rub surface 84 of the pivot housing 45 is a substantially planer and annular surface that resides on a plane substantially perpendicular to the pivot axis X.

Referring back to FIGS. 3 and 3a, the friction segment 82 of the sheath 80 of wear-resistant plastic material preferably extends along a substantial portion of the radial width of the rub surface 84 and includes a friction surface 86 abutting the rub surface 84 of the tension arm 14. The sheath 80 also includes an annular clamp segment or flap 88 extending around a circumferential outer surface of the spring plate 78 and at least partially over an upper annular surface of the spring plate 78 so as to retain the sheath 80 to the spring plate 78. The wear resistant plastic sheath 80 also includes an annular bead or flange 90 extending axially downward from an outer circumference of the sheath 80 over an annular shoulder 92 extending into an upper surface of the housing 45 of the tension arm 14. This flange 90 completely encircles the annular shoulder 92, providing a labyrinth seal between the damper assembly 76 and the tension arm 14. In the exemplary embodiment, a radial gap is provided between the flange 90 and the shoulder 92 to ensure that the dampening is controlled primarily by contact between the friction surface 86 and the rub surface 84. Further, while the flange 90 in the exemplary embodiment is generally in the shape of an annular bead, it is within the scope of the invention to utilize alternative shapes for the flange 90 and/or alternative structures for the labyrinth seal provided by the flange 90.

As shown in FIG. 2, the inner circumferential surface 94 of the center hole 96 extending through the spring plate 78 includes a plurality of teeth 98 extending radially inwardly therefrom. These teeth are embedded into the outer circumferential surface 100 of the pivot shaft 38 at the upper end 64 of the pivot shaft to securely attach the damper assembly 76 to the pivot shaft and consequently, to retain the proximal end 42 of the tension arm 14 axially between the base housing 16 and the damper assembly 76. This, in turn, retains the torsion spring 18 within the annular chamber 50. The biasing properties of the spring plate 78 (due to the substantially conical shape of the spring plate) also acts to force the friction segment 82 wear resistant plastic sheath 80 against the rub surface 84 of the housing 45 of the tension arm 14. The resulting frictional engagement between the friction surface 86 of the friction segment 82 and the rub surface 84 of the housing 45 acts to dampen severe pivotal movements of the tension arm 14 due to the torsionals experienced by the drive belt 12.

Referring to FIG. 4, the damper assembly 76 is constructed by first over-molding the sheath 80 of wear resistant plastic material over a substantially flat hardened steel washer 78'. This molded component 102 must then be acted upon by a deforming work piece 104 to deform the washer 78' into the preferred, substantially a conical shape as shown in FIG. 3. The work piece 104 has a substantially conical or frustoconical working end 106, where the sloping angles S of the working end 106 slope at the desired angle of deflection for the spring plate 78. The work piece 104 is coaxially applied against the molded piece 102 (or vice-versa) to deform the washer 78' until it achieves its desired shape. As will be appreciated by those of ordinary skill in the art, the greater the deflection angle S, the greater the biasing force that will be applied by the spring plate 78.

Figure 5:
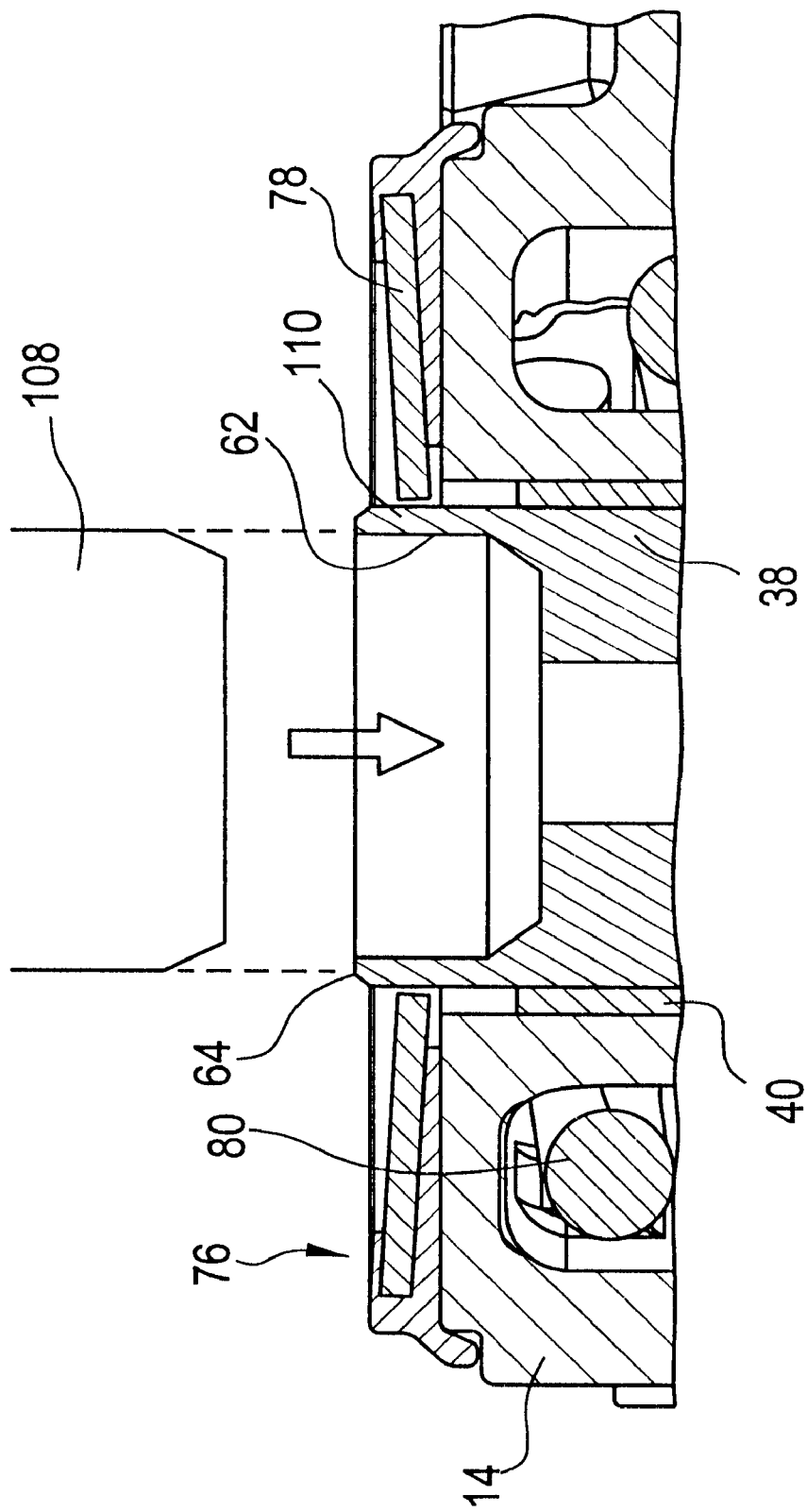
FIG. 5 illustrates a step of fixedly attaching the damper assembly to the pivot shaft in the exemplary embodiment of the present invention.

As discussed above, the damper assembly 76 also acts as a clamp plate to clamp the components of the belt tensioner together on the pivot shaft 38. As shown in FIG. 5, once the pivot bushing 40, outer bushing 56, housing 45 of the tension arm 14, torsion spring 18 and damper assembly 76 have been stacked on the base housing 16, or otherwise positioned coaxial with the pivot shaft 38, a diametrically expanding work piece 108, having a final outer diameter slightly larger than the inner diameter of the counter-bore 62 extending into the upper end 64 of the pivot shaft 38, is positioned into the counter bore 62 and diametrically expanded such that the circumferential walls 110 of the counter bore 62 are forced radially outwardly, into the teeth 98 on the inner circumferential surface 94 of the center hole 96 extending through the spring plate 78 so that the teeth 98 become embedded into the circumferential walls 110, thereby fixedly attaching the spring plate 78 and damper assembly 76 to the pivot shaft 38, and in turn, retaining the base housing 16, outer bushing 56, tension arm 14, pivot bushing 40, torsion spring 18 and damper assembly 76 altogether on the pivot shaft 36. It will be appreciated that there are other suitable coupling/retaining methods available to those of ordinary skill in the art, such as the use of radial riveting, all of which fall within the scope of the invention.

Some identified advantages of the belt tensioner 10 and damper assembly 76 described above include, but are not limited to: an overall reduction in the amount of components needed for the belt tensioner; a reduced cost in manufacturing the belt tensioner; a damper assembly that has a dual purpose of dampening rotation of the torsion arm and coupling components of the belt tensioner to the base housing; a spring plate that has a dual purpose of dampening rotation of the torsion arm and coupling components of the belt tensioner to the base housing; a damper assembly that includes a labyrinth seal; and a single piece damper assembly utilizing a co-molded spring and friction material. It is to be understood, however, that it is not necessary to meet any or all of the identified advantages or objects of the present invention disclosed herein in order to fall within the scope of any claims, since the invention is defined by the claims and since inherent and/or unforeseen advantages of the present invention may exist even though they may not be explicitly discussed herein.

Following from the above description and summaries, it should be apparent to those of ordinary skill in the art that, while the apparatuses and processes herein described constitute exemplary embodiments of the present invention, it is to be understood that the invention is not limited to these precise apparatuses and processes, and that changes may be made therein without departing from the scope of the invention as defined by the claims. Additionally, it is to be understood that the invention is defined by the claims and it is not intended that any limitations or elements describing the exemplary embodiments herein are to be incorporated into the meaning of the claims unless such limitations or elements are specifically listed in the claims.

What is claimed is:

1. A belt tensioner for a power transmission belt system, comprising:
   a base housing including a pivot shaft extending therefrom:
      a tension arm pivotally mounted on the pivot shaft at a proximal end of the tension arm, the proximal end of the tension arm including a rub surface and the distal end of the tension arm adapted to contact a power transmission belt;
      a torsion spring operatively coupled between the base and the distal end of the tension arm, adapted to bias the distal end of the tension arm against the power transmission belt; and
      a damper assembly adjacent to the proximal end of the tension arm, the damper assembly including a body of friction material including a friction surface adjacent to and facing the rub surface of the tension arm and a damper spring on which the body of friction material is integrally formed for biasing the body of friction material and associated friction surface against the rub surface of the tension arm.

2. The belt tensioner of claim 1, wherein the damper assembly is substantially disk-shaped and coaxially mounted on the pivot shaft.

3. The belt tensioner of claim 2, wherein the damper spring is an annular metallic spring plate coaxially integrated with a substantially disc-shaped body of friction material.

4. The belt tensioner of claim 3, wherein the spring plate has a generally conical shape and includes a convex side facing towards the rub surface of the tension arm, wherein the generally conical shape of the spring plate biases the body of friction material axially against the rub surface of the tension arm.

5. The belt tensioner of claim 4, wherein the damper assembly includes an annular flange extending at least partially axially towards the tension arm and encircling an annular shoulder of the tension arm, thereby providing a labyrinth seal between the damper assembly and the tension arm.

6. The belt tensioner of claim 5, wherein the annular flange extends from the body of friction material.

7. The belt tensioner of claim 4, wherein the generally conical spring plate includes a center opening through which the pivot shaft extends, and wherein the generally conical spring plate is fixedly attached to the pivot shaft.

8. The belt tensioner of claim 7, wherein the proximal end of the tension arm is positioned axially between the damper assembly and the base housing and wherein the fixed attachment of the generally conical spring plate to the pivot shaft of the base housing retains the base housing, tension arm and damper assembly together.

9. The belt tensioner of claim 8, wherein an annular cavity, coaxial with the pivot shaft, extends through the base housing and proximal end of the tension arm, and wherein the torsion spring is positioned in the annular cavity.

10. The belt tensioner of claim 1, wherein the body of friction material is molded over the damper spring.

11. The belt tensioner of claim 10, wherein the body of friction material is a plastic material.

12. The belt tensioner of claim 11, wherein the body of friction material is substantially disc-shaped, and the damper spring is an annular metallic spring plate coaxially molded with the substantially disc-shaped body of friction material and the annular metallic spring plate biases the body of friction material axially against the rub surface of the tension arm.

13. The belt tensioner of claim 12, wherein the annular metallic spring plate is coaxially attached to the pivot shaft of the base housing, and the proximal end of the tension arm is retained axially between the damper assembly and the base housing by the coaxial attachment of the annular metallic spring plate and pivot shaft.

14. The belt tensioner of claim 1, wherein the damper assembly is mounted to the base housing, coaxially with the pivot shaft, and includes an annular flange extending at least partially axially towards the tension arm and encircling an annular shoulder of the tension arm, thereby providing a labyrinth seal between the damper assembly and the tension arm.

15. The belt tensioner of claim 14, wherein the annular flange extends from the body of friction material.

16. The belt tensioner of claim 14, wherein the annular shoulder of the tension arm has an outer diameter and the annular flange extending from the damper assembly has an inner diameter slightly larger than the outer diameter of the annular shoulder of the tension arm.

17. The belt tensioner of claim 1, wherein the distal end of the tension arm includes a pulley mounted thereto and adapted to contact the power transmission belt.

18. A belt tensioner for a power transmission belt system, comprising:
   a base housing including a pivot shaft extending therefrom:
      a tension arm pivotally mounted on the pivot shaft at a proximal end of the tension arm, the proximal end of the tension arm including a rub surface and the distal end of the tension arm adapted to contact a power transmission belt;
      a torsion spring operatively coupled between the base and the distal end of the tension arm, adapted to bias the distal end of the tension arm against the power transmission belt; and
      a damper assembly adjacent to the proximal end of the tension arm, the damper assembly including an annular spring plate coaxially attached to the pivot shaft of the base housing, the annular spring plate having a body of friction material integrally formed thereon wherein at least a portion of the friction material is positioned axially between the annular spring plate and the rub surface of the tension arm;
      the body of friction material including a friction surface adjacent to and facing the rub surface of the tension arm;
      the annular spring plate capable of biasing the body of friction material and associated friction surface against the rub surface of the tension arm and retaining the proximal end of the tension arm and the body of friction material axially between the annular spring plate and the base housing.

19. The belt tensioner of claim 18, wherein the body of friction material is annular and is positioned coaxial with the pivot shaft, and includes an annular flange extending at least partially axially towards the tension arm and encircling an annular shoulder of the tension arm, thereby providing a labyrinth seal between the body of friction material and the tension arm.

20. The belt tensioner of claim 19, wherein the annular shoulder of the tension arm has an outer diameter and the annular flange extending from the damper assembly has an inner diameter slightly larger than the outer diameter of the annular shoulder of the tension arm.

21. The belt tensioner of claim 20, wherein the body of friction material is molded over the annular spring plate.

22. The belt tensioner of claim 18, wherein the body of friction material is molded over the annular spring plate.

23. The belt tensioner of claim 18, wherein the body of friction material is substantially annular and coaxially positioned with respect to the pivot shaft.

24. The belt tensioner of claim 23, wherein the rub surface of the tension arm and the friction surface of the body of friction material are substantially annular, coaxial with the pivot shaft and residing on parallel planes at least partially perpendicular to an axis of the pivot shaft.

25. A belt tensioner for a power transmission belt system, comprising:
   a base housing;
   a tension arm pivotally mounted on the base housing at a proximal end of the tension arm, the proximal end of the tension arm including a rub surface and the distal end of the tension arm adapted to contact a power transmission belt;
   a torsion spring operatively coupled between the base housing and the tension arm, adapted to bias the distal end of the tension arm against the power transmission belt; and
   a damper assembly adjacent to the proximal end of the tension arm, the damper assembly including a body of friction material including a friction surface adjacent to and facing the rub surface of the tension arm and a damper spring on which the body of friction material is integrally formed for biasing the body of friction material and associated friction surface against the rub surface of the tension arm;
   the damper assembly including an annular flange extending at least partially axially toward the tension arm, and the flange encircling an annular shoulder of the tension arm, thereby providing a labyrinth seal between the body of friction material and the tension arm.

26. The belt tensioner of claim 25, wherein the annular shoulder of the tension arm has an outer diameter and the annular flange extending from the damper assembly has an inner diameter slightly larger than the outer diameter of the annular shoulder of the tension arm.

27. The belt tensioner of claim 26, wherein the tension arm pivots on an axis and the body of friction material encircles the pivot axis of the tension arm and the annular flange extends from the body of friction material.

28. The belt tensioner of claim 27, wherein the body of friction material is molded over the damper spring.

29. A belt tensioner for a power transmission belt system, comprising:

a base housing;

a tension arm pivotally mounted on the base housing at a proximal end of the tension arm, the proximal end of the tension arm including a rub surface and the distal end of the tension arm adapted to contact a power transmission belt;

a torsion spring operatively coupled between the base housing and the tension arm, adapted to bias the distal end of the tension arm against the power transmission belt; and a damper assembly adjacent to the proximal end of the tension arm, the damper assembly including a body of friction material including a friction surface adjacent to and facing the rub surface of the tension arm and a damper spring on which the body of friction material is integrally formed for biasing the body of friction material and associated friction surface against the rub surface of the tension arm; and a labyrinth seal provided between the damper assembly and the tension arm.

30. The belt tensioner of claim 29, wherein the labyrinth seal includes an annular flange extending from one of the damper assembly and the tension arm at least partially axially towards other one of the damper assembly and the tension arm, and the flange encircling an annular shoulder of the other one of the damper assembly and the tension arm.

31. The belt tensioner of claim 29, wherein the labyrinth seal is provided between the body of friction material and the tension arm.

32. The belt tensioner of claim 29, wherein the labyrinth seal includes an annular flange extending from one of the body of friction material and the tension arm at least partially axially towards other one of the body of friction material and the tension arm, and the flange encircling an annular shoulder of the other one of the body of friction material and the tension arm.

33. A method for assembling a belt tensioner assembly comprising the steps of:

providing a base housing including a pivot shaft which includes an inner counter-bore;

positioning a torsion spring on the pivot shaft;

positioning a proximal end of a tension arm on the pivot shaft, the proximal end of the tension arm including a rub surface at least partially encircling the pivot shaft;

coupling the torsion spring between the base housing and the pivot shaft;

positioning a friction body axially over the proximal end of the tension arm such that a friction surface of the friction body faces the rub surface of the tension arm; and fixedly attaching a substantially annular spring plate axially over at least a portion of the friction body such that the friction material is integrally formed on the damper spring to retain the proximal end of the tension arm and the portion of the friction body axially between the base housing and the spring plate and to bias the friction surface of the friction body against the rub surface of the tension arm.

34. The method of claim 33, further comprising the step of, simultaneous to or prior to the fixedly attaching step, deforming a substantially planar annular plate in a generally conical shape to provide the annular spring plate.

35. The method of claim 34, wherein:

the pivot shaft has a hollow upper end having a diameter, an inner circumferential surface and an outer circumferential surface;

the annular spring plate has a center hole, the center hole including an inner circumferential surface with a plurality of teeth extending radially inwardly therefrom; and the fixedly attaching step includes a step of expanding the diameter of the hollow upper end of the pivot shaft to radially force the outer circumferential surface of the pivot shaft against the teeth extending from the inner circumferential surface of the center hole of the annular spring plate, thereby causing the annular teeth to become embedded into the pivot shaft.

36. The method of claim 33, wherein the fixedly attaching step comprises molding the friction body over the annular spring plate.

37. The method of claim 36, further comprising the step of, simultaneous to or prior to the fixedly attaching step, deforming a substantially planar annular plate in a generally conical shape to provide the annular spring plate.

38. The method of claim 37, wherein the deforming step occurs prior to the fixedly attaching step.

39. The method of claim 38, wherein the deforming step occurs prior to the molding step.

40. The method of claim 38, wherein the deforming step occurs after the molding step.

41. The method of claim 33, further comprising the step of providing a labyrinth seal between the friction body and the tension arm.

42. The method of claim 41, wherein the fixedly attaching step comprises molding the friction body over the annular spring plate.

43. The method of claim 42, wherein:

the tension arm includes an annular shoulder coaxial with the pivot shaft, the annular shoulder having a diameter;

the molding step includes the step of molding an annular flange extending at least partially axially from the friction body, the annular flange having a diameter slightly larger than the diameter of the annular shoulder of the tension arm; and the step of positioning a friction body axially over the proximal end of the tension arm, includes the step of encircling the annular shoulder of the tension arm with the annular flange extending from the friction body to provide a labyrinth seal between the friction body and the tension arm.

44. The method of claim 42, further including the step of, after the molding step, deforming the damper spring into a substantially conical shape by coaxially applying a deforming work piece having a corresponding substantially conical shape, against the damper spring.

45. The method of claim 42, further including the step of, after the molding step, deforming the damper spring into a substantially conical shape by coaxially applying the damper spring against a deforming work piece having a corresponding conical shape.

46. A belt tensioner for a power transmission belt system, comprising:

a base housing;

a tension arm pivotally mounted on the pivot shaft at a proximal end of the tension arm, the proximal end of the tension arm including a rub surface and the distal end of the tension arm adapted to contact a power transmission belt;

a torsion spring operatively coupled between the base housing and the tension arm, adapted to bias the distal end of the tension arm against the power transmission belt; and a damper assembly adjacent to the proximal end of the tension arm, the damper assembly including a damper member having a friction surface adjacent to and facing the rub surface of the tension arm and a damper spring on which the damper member is formed, for biasing the damper member and associated friction surface against the rub surface of the tension arm.

47. The belt tensioner of claim 46, wherein the damper member is molded over the damper spring.

48. The belt tensioner of claim 47, wherein:

the damper member is substantially disc-shaped;

the damper spring is an annular metallic spring plate coaxially molded with the substantially disc-shaped damper member; and the damper assembly is mounted to the housing, coaxial with an axis of rotation of the tension arm.

49. The belt tensioner of claim 47, wherein the damper member is a wear resistant polymeric friction material.

50. A damper assembly for use in a belt tensioner for a power transmission belt system, where in the belt tensioner includes a base housing having a pivot shaft including a counter-bore extending therefrom; a tension arm, a proximal end of which includes a rub surface and a distal end of which is adapted to contact a power transmission belt; a torsion spring operatively coupled between the base housing and the tension arm, the torsion spring being adapted to bias the distal end of the tension arm against the power transmission belt; and a damper assembly which provides a damping effect to dampen severe pivotal movements of the tension arm due to torsional movement on the drive belt, by urging a friction member against the rub surface of the tension arm, the damper assembly comprising:

a damper member having a friction surface;

a damper spring, on which the damper member having a friction surface is integrally formed, for biasing the damper member having the friction member thereon against the rub surface of the tension arm; and an annular flange extending at least partially axially toward the tension arm and encircling an annular shoulder of the tension arm to provide a labyrinth seal between the damper member and the tension arm.

51. The damper assembly of claim 50, wherein the damper member is molded on the damper spring.

52. The damper assembly of claim 50, wherein the damper member is made of wear resistant plastic friction material and the damper spring is made of a metal.

53. The damper assembly of claim 50, wherein the damper member is made of nylon 4,6 and the damper spring is made of hardened steel.

54. The damper assembly of claim 50, wherein the damper assembly is constructed by over-molding a wear resistant plastic material on a substantially flat hardened steel member and deforming the substantially flat hardened steel member into a substantially conical shape.

55. The damper assembly of claim 50, wherein the damper spring includes a hole extending centrally through the damper spring, the hole having a circumferential diameter slightly larger than the outer diameter of the pivot shaft, for accepting the pivot shaft therethrough, the hole including a plurality of projections on the inner circumferential surface of the hole, whereby, upon insertion of the pivot shaft through the hole and extending a diametrically expanding workpiece having a final diameter slightly larger than the inner diameter of the counter-bore, the projections on the inner circumferential surface of the hole become embedded in the circumferential wall of a counter bore in the pivot shaft thereby fixedly attaching the damper assembly to the pivot shaft.

* * * * *